UNITED STATES PATENT OFFICE.

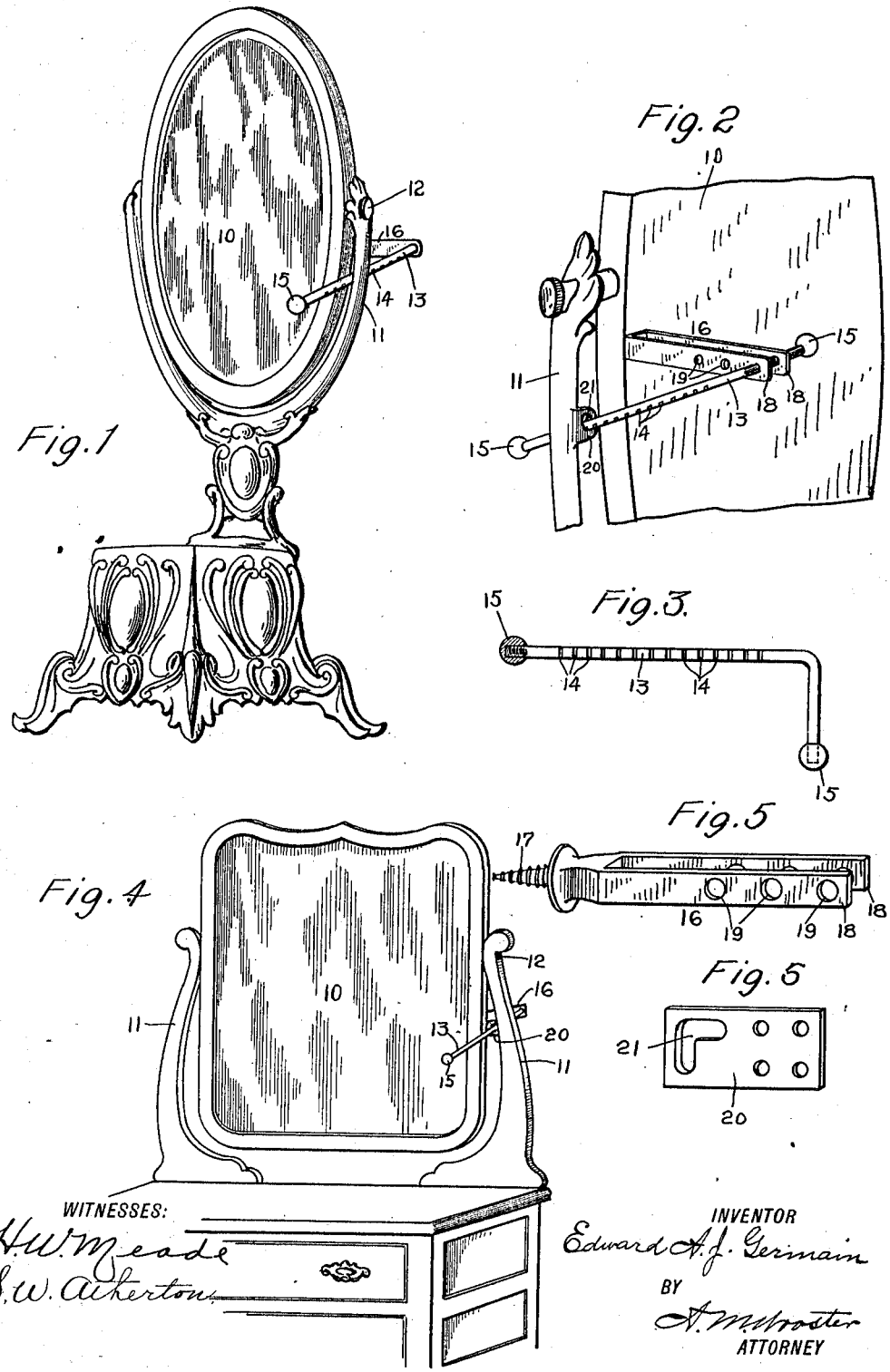

EDWARD A. J. GERMAIN, OF BRIDGEPORT, CONNECTICUT.

ADJUSTING DEVICE FOR MIRRORS.

993,051.  Specification of Letters Patent.  Patented May 23, 1911.

Application filed January 3, 1911. Serial No. 600,662.

*To all whom it may concern:*

Be it known that I, EDWARD A. J. GERMAIN, a citizen of the United States, residing at Bridgeport, county of Fairfield, State of Connecticut, have invented an Improvement in Adjusting Devices for Mirrors, of which the following is a specification.

This invention relates to the class of mirror holding devices illustrated and described in my former Letters Patent Number 931,291, dated August 17, 1909, and the object of the invention is to so perfect the details of construction that a limited number of sizes of the device may be made which will adapt it for attachment to any size of mirror from a shaving set to a large dresser and each device shall be adapted to mirrors of quite a considerable variation in size, the device furthermore being adapted for convenient attachment to any mirror and to conveniently adjust the mirror at varying angles either forward or backward.

With these and other objects in view I have devised the novel mirror adjusting device which I will now describe, referring to the accompanying drawing forming a part of this specification and using reference characters to indicate the several parts.

Figure 1 is a perspective in front elevation illustrating the application of my novel adjusting device to a small mirror as for shaving mirrors; Fig. 2 a detail perspective in rear elevation; Fig. 3 an inverted plan view of the adjusting bar detached; Fig. 4 a perspective in front elevation illustrating the application of the device to a dresser mirror; Fig. 5 a perspective of the adjusting bar holder detached; and Fig. 6 is a perspective of the locking plate detached.

10 denotes a mirror, 11 the side supports therefor which may be of any ordinary or preferred construction and 12 pivots on which the mirror swings.

13 denotes the adjusting bar which is bent at a right angle. The long arm is provided on its under side with notches 14 and the ends of both arms are provided with detachable heads 15 which are preferably threaded to engage threaded ends of the rod.
The long arm of the rod is made long enough to provide ample forward and backward swing to the mirror and the short arm is made long enough to provide for using the same attachment on different sizes and styles of mirrors, the idea being to provide an attachment that may be made in a limited number of sizes, some of which will be adaptable to all ordinary sizes and styles of mirrors.

16 denotes the adjusting bar holder which is detachably secured to the back of the mirror as by a screw 17 which is cast therein or is otherwise made integral therewith. I have shown an adjusting bar holder comprising two arms 18 provided with a plurality of holes 19 in transverse alinement. As the short arm of the adjusting bar and the holder therefor are back of the mirror it makes no difference with which set of holes in the holder the bar is engaged or how much the short arm of the bar extends from the holder on either side.

The mirror is swung backward or forward as may be required by means of the adjusting bar and is locked at any required adjustment by engaging one of the notches with a locking plate 20 which may be formed integral with or detachably secured to the side support on the corresponding side of the mirror. I have shown the locking plate as provided with an angle slot 21 through which the adjusting bar passes, the head at the end of the long arm of the bar being removed in assembling and afterward turned to place. This angle slot is provided in preference to a hole as it is preferable for locking the mirror at an extreme adjustment either forward or backward. When the mirror is swung but a short distance either forward or backward, the adjusting bar may be conveniently engaged with the bottom of the vertical portion of the angle slot to lock the mirror in place. Should a greater adjustment, however, be required, either forward or backward, it would be found more convenient to engage the adjusting bar with the horizontal portion of the angle slot which may be easily done as the short arm of the bar will slide freely in the holder. It will of course be understood that it is not essential that the adjusting bar holder be provided with two arms. For larger sizes of mirrors, however, I preferably provide the holder with two arms in order to better support the adjusting bar and hold it firmly in place.

Having thus described my invention I claim:

1. A device of the character described comprising an adjusting bar bent at a right angle, the long arm of which is provided with notches in its underside, a holding device adapted for attachment to the back of a mirror and provided with holes either of which is adapted to be engaged by the short arm of the adjusting bar and a locking plate adapted for attachment to the side support of the mirror and adapted to be engaged by a notch in the long arm of the adjusting bar.

2. A device of the character described comprising an adjusting bar bent at a right angle, the long arm of which is provided with notches in its under side, a holding device adapted for attachment to the back of a mirror and comprising arms having holes in alinement, either set of which is adapted to be engaged by the short arm of the adjusting bar, and a locking plate adapted for attachment to a side support of the mirror and adapted to be engaged by a notch in the long arm of the adjusting bar.

3. A device of the character described comprising an adjusting bar bent at a right angle, the long arm of which is provided with notches in its under side, a holding device adapted for attachment to the back of a mirror which is engaged by the short arm of the adjusting bar and a locking plate adapted for attachment to a side support of the mirror and having an angle slot through which the long arm of the adjusting bar passes, either the horizontal portion or the bottom of the vertical portion of said slot being adapted for engagement by a notch in the angle bar, substantially as described, for the purpose specified.

In testimony whereof I affix my signature in presence of two witnesses.

EDWARD A. J. GERMAIN.

Witnesses:
A. M. WOOSTER,
S. W. ATHERTON.

---

Copies of this patent may be obtained for five cents each, by addressing the "Commissioner of Patents, Washington, D. C."